T. W. JOHNSON.
Concentrating Extracts.

No. 81,643.

Patented Sept. 1, 1868.

United States Patent Office.

THOMAS W. JOHNSON, OF NEW YORK, N. Y.

*Letters Patent No. 81,643, dated September 1, 1868.*

---

IMPROVED APPARATUS FOR CONCENTRATING EXTRACTS.

---

The Schedule referred to in these Letters Patent and making part of the same.

---

TO ALL WHOM IT MAY CONCERN:

Be it known that I, THOMAS W. JOHNSON, of New York, in the county and State of New York, have invented a new and improved Apparatus for Concentrating Extracts; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
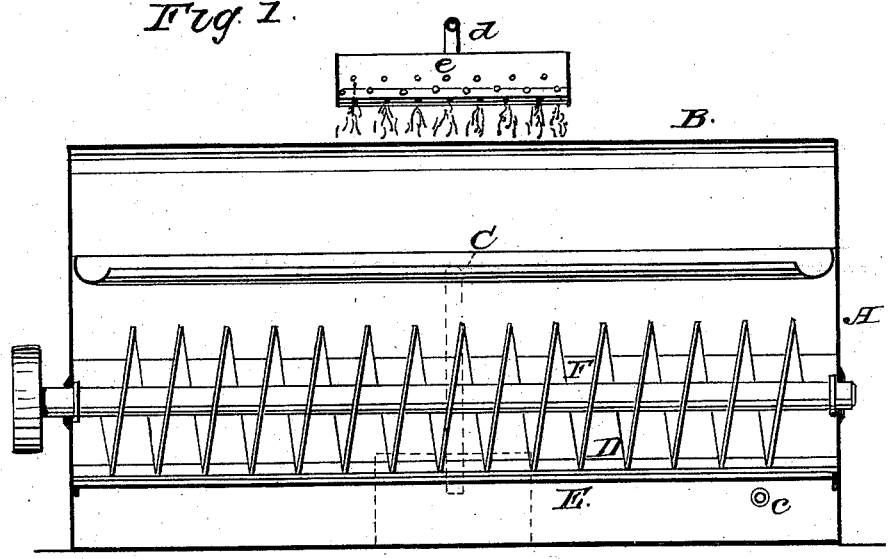
Figure 1 represents a longitudinal section of this invention.
Figure 2:
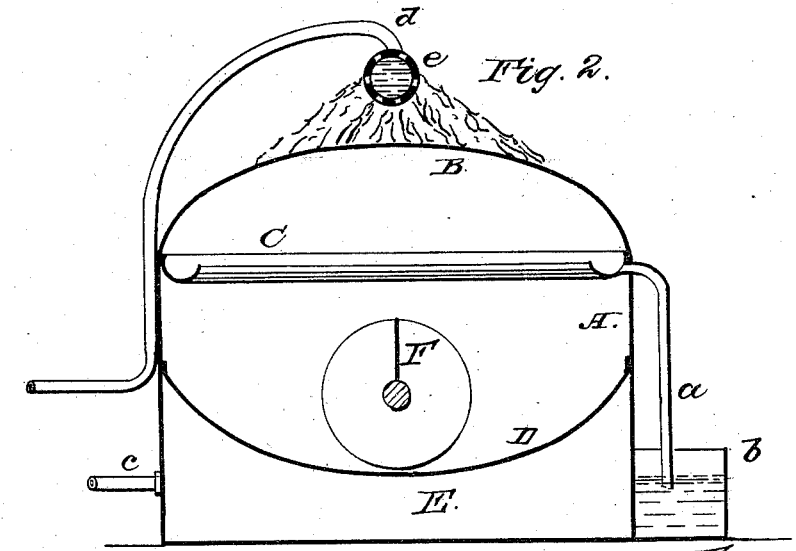
Figure 2 is a transverse section thereof.

This invention consists in the arrangement of an air-tight receiver, provided with a convex or semi-cylindrical top, which terminates in a gutter, and with a concave false bottom, which forms the top of a heating-chamber, in combination with an agitator extending throughout the entire length of the receiver, and with a cold-water-jet over the convex top, in such a manner that when the temperature of the extract to be concentrated in the receiver is raised to about 170° or 180°, the agitator will cause the vapors to rise, and the vapors, on coming in contact with the inner surface of the top, (which is cooled by the jet of cold water thrown on it,) will condense, thereby forming a partial vacuum, which materially facilitates the evaporation.

The water resulting from the condensation of the vapors is collected in the gutter, from which it is carried off by a pipe terminating in a tank partially filled with water, so that the access of air to the interior of the receiver is prevented, and that an apparatus is obtained in which the extract of tan-bark or other similar liquid can be concentrated with comparatively little expenditure of fuel, and at a temperature below the boiling-point of water, whereby all danger of scorching the extract is avoided.

A represents a receiver, which is made of sheet metal or any other suitable material. This receiver is provided with a convex or semi-cylindrical top, B, which terminates over the gutter C, so that the water resulting from the condensation of the vapors which come in contact with the inner surface of the top will collect in the gutter, from which it discharges through a pipe, $a$, which terminates in a tank, $b$, partially filled with water, so that no air can enter into the receiver through said pipe.

The receiver A is provided with a concave false bottom, D, which forms the top of the heating-chamber E, which communicates by a pipe, $c$, with a generator of steam or hot air, so that the temperature of the liquid extract to be concentrated in the receiver can be raised to any desired degree.

Through the receiver A, and close to the concave false bottom, extends an agitator, F, to which a revolving motion is imparted by a belt and pulley, or by any other suitable means.

The receiver is filled with the liquid extract to be concentrated, and the liquid is heated to 170° or 180°, while the agitator is kept in continuous motion. By the action of the agitator the extract is kept uniformly mixed, and prevented from forming a sediment on the bottom of the receiver; and furthermore, the vapors are disengaged from the liquid, and caused to rise so as to strike the top, B.

Over this top is secured a pipe, $d$, terminating in a rose, $e$, so that a jet of cold water can be thrown on said top, whereby the same is kept cool, and in the proper condition to condense the vapors which come in contact with its inner surface.

By the condensation of the vapors a partial vacuum is formed in the interior of the receiver A, and thereby the evaporation of the liquid is materially facilitated. The water resulting from the condensation of the vapors collects in gutter C, and is drawn off by the pipe $a$, as above stated.

By these means an apparatus is obtained in which the operation of concentrating extracts of tan-bark or other liquids of a similar nature can be effected at a low temperature, thereby preventing all danger of scorching the extract, and effecting the operation in the most economical manner.

Having thus described my invention, what I claim as new, and desire to secure by Letters Patent, is—

The receiver A, provided with a convex top, B, gutter C, and cold-water pipe $d$, in combination with the agitator F and heating-chamber E, substantially as and for the purpose set forth.

THOS. W. JOHNSON.

Witnesses:
W. HAUFF,
E. F. KASTENHUBER.